US012794389B2

(12) United States Patent
Hart et al.

(10) Patent No.: US 12,794,389 B2
(45) Date of Patent: Nov. 10, 2026

(54) CONTROLLER FOR AN AXIAL FLUX MACHINE AND METHOD

(71) Applicant: Evolito LTD, Bicester (GB)

(72) Inventors: Simon David Hart, Wales (GB); Natalia Narozanska, Warwick (PL)

(73) Assignee: Evolito LTD, Bicester (GB)

( * ) Notice: Subject to any disclaimer, the term of this patent is extended or adjusted under 35 U.S.C. 154(b) by 200 days.

(21) Appl. No.: 18/816,850

(22) Filed: Aug. 27, 2024

(65) Prior Publication Data

US 2025/0112572 A1 Apr. 3, 2025

(30) Foreign Application Priority Data

Sep. 28, 2023 (GB) ...................................... 2314926

(51) Int. Cl.
*H02P 21/05* (2006.01)
*H02P 21/22* (2016.01)

(52) U.S. Cl.
CPC .............. *H02P 21/05* (2013.01); *H02P 21/22* (2016.02); *H02P 2207/05* (2013.01)

(58) Field of Classification Search
CPC ....... H02P 21/05; H02P 21/22; H02P 2207/05
See application file for complete search history.

(56) References Cited

U.S. PATENT DOCUMENTS 9,673,685 B2 6/2017 Cooper et al.
2023/0223878 A1* 7/2023 Woolmer ................ H02P 21/05 318/400.02

FOREIGN PATENT DOCUMENTS

CN 112459721 A 3/2021
CN 113093535 A 7/2021

OTHER PUBLICATIONS

European Patent Office Extended Search Report for Application No. 24203347.0 dated Jan. 24, 2025 (11 pages).
Dieterle Oliver et al: ""“Feedforward Compensation of Torque Ripples in Dual Three-Phase PMSM Fed From Separate DC Links With Different Voltage Levels”"", IEEE Transactions on Industrial Electronics, IEEE Service Center, Piscataway, NJ, USA, vol. 68, No. 10, Oct. 1, 2020 (Oct. 1, 2020), pp. 9036-9045 (10 pages).
United Kingdom Intellectual Property Office for Application No. 2314926.3 dated Mar. 14, 2024 (6 pages).

* cited by examiner

*Primary Examiner* — Cortez M Cook
(74) *Attorney, Agent, or Firm* — Michael Best & Friedrich LLP

(57) ABSTRACT

We describe a method and controller for controlling an axial flux machine in which an alternating current or voltage supplied to the plurality of coils injects a compensation signal to generate mechanical vibrations in the axial flux machine. The compensation signal is applied in response to detecting one or more mechanical resonances in the axial flux machine that are at frequencies that are different to a principal mechanical resonant frequency of the axial flux machine. One or more characteristics of the one or more mechanical resonances in the axial flux machine are identified, and in response to the identification of the one or more characteristics, the compensation signal is adjusted. The mechanical vibrations generated by the compensation signal and the adjusted compensation signal are for reducing a respective amplitude of one or more of the detected mechanical resonances in the axial flux machine.

23 Claims, 7 Drawing Sheets

CONTROLLER FOR AN AXIAL FLUX MACHINE AND METHOD

FIELD OF THE INVENTION

The present invention relates to an axial flux machine, an axial flux machine and a method of controlling an axial flux machine, in particular the present invention relates to techniques of reducing mechanical resonant vibrations in an axial flux machine.

BACKGROUND OF THE INVENTION

All structures have natural frequencies of vibration at which exciting forces cause amplification. This amplification occurs when the excitation frequency coincides with the natural frequency in a condition called resonance.

Rotating machines are particularly prone to resonance induced mechanical vibration which occurs when a natural frequency is at or close to an exciting frequency, such as rotor speed. For machinery—such as pumps, turbines, electric motors and generators, resonance can amplify small vibratory forces from machine operation, and severe sometimes destructive vibration levels can result.

With variable-speed drives, exciting frequencies change with motor speed and result in resonance each time exciting harmonic frequencies cross a natural resonance frequency. Strength of resonance varies with excitation amplitude and proximity to the natural frequency, as well as with, damping, mass, and stiffness of subject machine components associated with the natural frequency.

Natural resonance frequencies of rotating machines are a consideration in a machine's design and may be adjusted i.e., minimised and perhaps shifted in frequency according to material properties and design of key components, typically stators, rotors, housings and connected systems.

Whereas combatting resonant drivers in axial flux machines continues to be a consideration in machine design, in recent years, fault-tolerant control of permanent magnet synchronous axial flux motors/generators has become important, because automotive and aerospace applications require high reliability.

A wide variety of fault-tolerant inverter topologies and their corresponding fault-tolerant algorithms have been studied and particularly phase loss either because of motor winding or open circuit inverter faults is an important consideration in loss tolerance and continued operation in multiphase machines.

Though phase loss tolerance is a valuable contribution to fault tolerance, for axial flux machines, particularly aerospace applications need reliable fault tolerance in the event of whole inverter/motor controller failure and or electric machine failure. In such an instance only dual redundant components are a solution.

For axial and radial flux motors, different fault tolerance approaches are applied. Radial flux machines often use concentric stators and rotors which can operate in parallel, with each rotor/stator pair capable of operating independently of the other.

A similar approach as for radial motors has being suggested for axial motors i.e., having concentric rings of magnets on a rotor and having opposing concentric rings of stator segments in the stator. However torque/power are severely compromised if an outer ring motor fails and because of this poor translation of a radial solution to axial topologies, and their remarkably short axial length, axial flux machines have tended to solve redundancy by stacking motors, each with its own controller and each able to operate independently, but also cooperatively as a group. However, the axial flux solution to fault tolerance of stacking motors inevitably increases axial length, losing a key advantage of axial flux topology.

We have appreciated the need for fault tolerant axial flux machines which do not reply on stacked motor designs for fault tolerant operation, but maintain the short axial length by building dual axial flux machines in the same plane. The approach adopted conflicts with all commonly taught motor/generator engineering principles because of inherent magnetic imbalances when running under fault conditions. We have therefore appreciated the need for an improved axial flux machine, an axial flux machine controller and a method of controlling an axial flux machine.

SUMMARY OF THE INVENTION

The present invention is defined by the independent claims appended hereto. Further advantageous embodiments are also defined by the dependent claims, also appended hereto.

We describe a method of controlling an axial flux machine, the axial flux machine comprising a stator comprising a stator housing enclosing a plurality of stator pole pieces disposed circumferentially at intervals around an axis of the machine, each of the stator pole pieces having a set of coils wound therearound for generating a magnetic field; and a rotor comprising a set of permanent magnets and mounted for rotation about the axis of the machine, the rotor being spaced apart from the stator along the axis of the machine to define a gap between the stator and rotor and in which magnetic flux in the machine is generally in an axial direction, the method comprising: detecting one or more mechanical resonances in the axial flux machine; controlling at least one or both of an alternating current and an alternating voltage supplied to the plurality of coils in response to detecting the one or more mechanical resonances to inject a compensation signal to generate mechanical vibrations in the axial flux machine for reducing a respective amplitude of one or more of the detected mechanical resonances of the axial flux machine, identifying one or more characteristics of the one or more mechanical resonances in the axial flux machine; adjusting the compensation signal in response to the identified one or more characteristics of the one or more mechanical resonances in the axial flux machine, wherein the detected one or more mechanical resonances in the axial flux machine are one or more mechanical resonances at frequencies that are different to a principal mechanical resonant frequency of the axial flux machine.

The mechanical vibrations generated by the compensation signal and the adjusted compensation signal are for reducing a respective amplitude of one or more of the detected mechanical resonances in the axial flux machine.

Detecting one or more mechanical resonances may comprise receiving vibration sensor data, the vibration sensor data comprising vibration sensor data from one or more locations of the axial flux machine. Identifying one or more characteristics of the one or more mechanical resonances in the axial flux machine may comprise identifying at least a frequency component and bandwidth of respective one or more mechanical resonances in the axial flux machine from the vibration sensor data.

Adjusting the compensation signal in response to the identified one or more characteristics of the one or more mechanical resonances may comprise adjusting the compensation signal in order to adjust one or more characteristics of the one or more mechanical vibrations generated by the compensation signal in the axial flux machine. The one or more characteristics of the one or more mechanical vibrations generated by the compensation signal may comprise one or more of a frequency and bandwidth of the generated one or more mechanical vibrations in the axial flux machine.

In the methods, the injected compensation signal may be configured to generate two or more mechanical vibrations, each having a different frequency from each other, and wherein the frequencies of the respective two or more generated mechanical vibrations are chosen to generate one or more harmonic beat mechanical vibrations having a different frequency to the two or more generated mechanical vibrations, and wherein one or more of the generated mechanical vibrations and the generated harmonic beat mechanical vibrations may reduce a respective amplitude of one or more of the detected mechanical resonances.

The alternating current through each coil may be represented as vectored direct current components comprising a Direct current ($I_d$) component and a Quadrature current ($I_q$) component that are orthogonal to one another, and wherein, when the compensation signal is an injected alternating current, the compensation signal may comprise a modulated current component added to at least one of the Quadrature Current ($I_q$) and the Direct Current ($I_d$) components to generate the one or more mechanical vibrations in the axial flux machine. Adjusting the compensation signal may comprise adjusting the modulated current component in response to the identified one or more characteristics of the one or more mechanical resonances in order to adjust one or more characteristics of the one or more mechanical vibrations generated by the compensation signal in the axial flux machine.

The alternating current supplied to the plurality of coils may be a three-phase alternating current, and wherein $I_d$ and $I_q$ represent vectored current components of the combination of all three-phases.

The method may also comprise comparing the one or more characteristics of the one or more identified mechanical resonances to a model defining one or more characteristics of the axial flux machine; and generating a first warning signal if a difference between the one or more characteristics of the one or more identified mechanical resonances and the one or more characteristics in the model is greater than a threshold difference. The method may further comprise generating a second warning signal if a value of adjustment for adjusting the compensation signal is greater than a threshold limit of adjustment.

The detected one or more resonances in the axial flux machine may be at lower frequencies to the principal resonant frequency of the axial flux machine. The principal resonant frequency of the axial flux machine may be at or around the $60^{th}$ order harmonic of the axial flux machine, and the identified one or more resonant frequencies may be at or around a $20^{th}$ and/or $40^{th}$ order harmonic of the axial flux machine.

We also describe a controller for an axial flux machine, the axial flux machine comprising a stator comprising a stator housing enclosing a plurality of stator pole pieces disposed circumferentially at intervals around an axis of the machine, each of the stator pole pieces having a set of coils wound therearound for generating a magnetic field; and a rotor comprising a set of permanent magnets and mounted for rotation about the axis of the machine, the rotor being spaced apart from the stator along the axis of the machine to define a gap between the stator and rotor and in which magnetic flux in the machine is generally in an axial direction, the controller comprising: one or more electrical inputs for receiving one or more supply voltages or currents; and one or more electrical outputs for supplying one or more alternating currents or voltages to the axial flux machine coils, wherein the controller is configured to: detect one or more mechanical resonances in the axial flux machine; control at least one or both of an alternating current and an alternating voltage supplied to the plurality of coils in response to detection the one or more mechanical resonances to inject a compensation signal to generate mechanical vibrations in the axial flux machine for reducing a respective amplitude of one or more of the detected mechanical resonances of the axial flux machine, identify one or more characteristics of the one or more mechanical resonances in the axial flux machine; adjust the compensation signal in response to the identified one or more characteristics of the one or more mechanical resonances in the axial flux machine, wherein the detected one or more mechanical resonances in the axial flux machine are one or more mechanical resonances at frequencies that are different to a principal mechanical resonant frequency of the axial flux machine.

The controller may comprise one or more sensor inputs for receiving vibration sensor data, and the controller is configured to detect the one or more mechanical resonances from the vibration sensor data, wherein the vibration sensor data comprises vibration sensor data from one or more locations of the axial flux machine. The controller may be configured to identify one or more characteristics of the one or more mechanical resonances in the axial flux machine by identify at least a frequency component and bandwidth of respective one or more mechanical resonances in the axial flux machine from the vibration sensor data.

The controller may be configured to adjust the compensation signal in response to the identified one or more characteristics of the one or more mechanical resonances by adjust the compensation signal in order to adjust one or more characteristics of the one or more mechanical vibrations generated by the compensation signal in the axial flux machine. The one or more characteristics of the one or more mechanical vibrations generated by the compensation signal may comprise one or more of a frequency and bandwidth of the generated one or more mechanical vibrations in the axial flux machine.

The controller may be configured to inject the compensation signal so as to generate two or more mechanical vibrations, each having a different frequency from each other, and wherein the frequencies of the respective two or more generated mechanical vibrations are chosen to generate one or more harmonic beat mechanical vibrations having a different frequency to the two or more generated mechanical vibrations, and wherein one or more of the generated mechanical vibrations and the generated harmonic beat mechanical vibrations reduce a respective amplitude of one or more of the detected mechanical resonances.

The alternating current through each coil may be represented as vectored direct current components comprising a Direct current ($I_d$) component and a Quadrature current ($I_q$) component that are orthogonal to one another, and wherein, when the compensation signal is an injected alternating current, the controller generates the compensation signal using a modulated current component added to at least one of the Quadrature Current ($I_q$) and the Direct Current ($I_d$) components to generating the one or more mechanical vibrations in the axial flux machine. The controller may adjust the compensation signal by adjusting the modulated current component in response to the identified one or more characteristics of the one or more mechanical resonances in order to adjust one or more characteristics of the one or more mechanical vibrations generated by the compensation signal in the axial flux machine.

The alternating current supplied to the plurality of coils may be a three-phase alternating current, and wherein $I_d$ and $I_q$ represent vectored direct current components of the combination of all three-phases.

The controller may be configured to compare the one or more characteristics of the one or more identified mechanical resonances to a model defining one or more characteristics of the axial flux machine; and generate a first warning signal if a difference between the one or more characteristics of the one or more identified mechanical resonances and the one or more characteristics in the model is greater than a threshold difference. The controller may be configured to generate a second warning signal if a value of adjustment for adjusting the compensation signal is greater than a threshold limit of adjustment.

The detected one or more resonances in the axial flux machine may be at lower frequencies to the principal resonant frequency of the axial flux machine. The principal resonant frequency of the axial flux machine may be at or around the $60^{th}$ order harmonic of the axial flux machine, and the identified one or more resonant frequencies may be at or around a $20^{th}$ and/or $40^{th}$ order harmonic of the axial flux machine.

We also describe an axial flux machine, comprising: a stator comprising a stator housing enclosing a plurality of stator pole pieces disposed circumferentially at intervals around an axis of the machine, each of the stator pole pieces having a set of coils wound therearound for generating a magnetic field; a rotor comprising a set of permanent magnets and mounted for rotation about the axis of the machine, the rotor being spaced apart from the stator along the axis of the machine to define a gap between the stator and rotor and in which magnetic flux in the machine is generally in an axial direction; and a controller comprising: one or more electrical inputs for receiving one or more supply voltages or currents; and one or more electrical outputs for supplying one or more alternating currents or voltages to the axial flux machine coils, wherein the controller is configured to: detect one or more mechanical resonances in the axial flux machine; control at least one or both of an alternating current and an alternating voltage supplied to the plurality of coils in response to detection the one or more mechanical resonances to inject a compensation signal to generate mechanical vibrations in the axial flux machine for reducing a respective amplitude of one or more of the detected mechanical resonances of the axial flux machine, identify one or more characteristics of the one or more mechanical resonances in the axial flux machine; adjust the compensation signal in response to the identified one or more characteristics of the one or more mechanical resonances in the axial flux machine, wherein the detected one or more mechanical resonances in the axial flux machine are one or more mechanical resonances at frequencies that are different to a principal mechanical resonant frequency of the axial flux machine.

The axial flux machine may comprise one or more vibration sensors mounted to the machine for sensing vibrations in the machine and generating vibration sensing data, wherein the controller comprises one or more sensor inputs for receiving the vibration sensor data, and the controller is configured to detect the one or more mechanical resonances from the vibration sensor data, wherein the vibration sensor data comprises vibration sensor data from one or more locations of the axial flux machine. The controller may be configured to identify one or more characteristics of the one or more mechanical resonances in the axial flux machine by identify at least a frequency component and bandwidth of respective one or more mechanical resonances in the axial flux machine from the vibration sensor data.

The controller may be configured to adjust the compensation signal in response to the identified one or more characteristics of the one or more mechanical resonances by adjust the compensation signal in order to adjust one or more characteristics of the one or more mechanical vibrations generated by the compensation signal in the axial flux machine. The one or more characteristics of the one or more mechanical vibrations generated by the compensation signal may comprise one or more of a frequency and bandwidth of the generated one or more mechanical vibrations in the axial flux machine.

The controller may be configured to inject the compensation signal so as to generate two or more mechanical vibrations, each having a different frequency from each other, and wherein the frequencies of the respective two or more generated mechanical vibrations are chosen to generate one or more harmonic beat mechanical vibrations having a different frequency to the two or more generated mechanical vibrations, and wherein one or more of the generated mechanical vibrations and the generated harmonic beat mechanical vibrations reduce a respective amplitude of one or more of the detected mechanical resonances.

The alternating current through each coil may be represented as vectored direct current components comprising a Direct current ($I_d$) component and a Quadrature current ($I_q$) component that are orthogonal to one another, and wherein, when the compensation signal is an injected alternating current, the controller generates the compensation signal using a modulated current component added to at least one of the Quadrature Current ($I_q$) and the Direct Current ($I_d$) components to generating the one or more mechanical vibrations in the axial flux machine. The controller may adjust the compensation signal by adjusting the modulated current component in response to the identified one or more characteristics of the one or more mechanical resonances in order to adjust one or more characteristics of the one or more mechanical vibrations generated by the compensation signal in the axial flux machine.

The alternating current supplied to the plurality of coils may be a three-phase alternating current, and wherein $I_d$ and $I_q$ represent vectored direct current components of the combination of all three-phases.

The controller may be configured to compare the one or more characteristics of the one or more identified mechanical resonances to a model defining one or more characteristics of the axial flux machine; and generate a first warning signal if a difference between the one or more characteristics of the one or more identified mechanical resonances and the one or more characteristics in the model is greater than a threshold difference. The controller may be configured to generate a second warning signal if a value of adjustment for adjusting the compensation signal is greater than a threshold limit of adjustment.

The detected one or more resonances in the axial flux machine may be at lower frequencies to the principal resonant frequency of the axial flux machine. The principal resonant frequency of the axial flux machine may be at or around the $60^{th}$ order harmonic of the axial flux machine, and the identified one or more resonant frequencies may be at or around a $20^{th}$ and/or $40^{th}$ order harmonic of the axial flux machine.

The stator housing may have an annular shape forming a hollow region about the axis of the machine, and wherein the rotor is formed of an annulus and having a hollow central region about the axis of the machine.

The axial flux machine may comprise a second rotor disposed on an opposite side of the stator to the first rotor, the second rotor comprising a set of permanent magnets on a first side of the second rotor facing the stator, the second rotor being mounted for rotation about the axis of the machine and relative to the stator, the second rotor being spaced apart from the stator along the axis of the machine to define an axial gap between the stator and second rotor and in which magnetic flux in the machine is generally in an axial direction.

We also describe a method of testing an axial flux machine, the axial flux machine comprising a stator comprising a stator housing enclosing a plurality of stator pole pieces disposed circumferentially at intervals around an axis of the machine, each of the stator pole pieces having a set of coils wound therearound for generating a magnetic field; a rotor comprising a set of permanent magnets and mounted for rotation about the axis of the machine, the rotor being spaced apart from the stator along the axis of the machine to define a gap between the stator and rotor and in which magnetic flux in the machine is generally in an axial direction; and a plurality of vibration sensors for generating vibration sensor data from one or more locations of the axial flux machine, the method comprising: controlling at least one or both of an alternating current and an alternating voltage supplied to the plurality of coils to inject a test signal to generate one or more mechanical vibrations in the axial flux machine; detecting the one or more mechanical vibrations in the axial flux machine using the vibration sensor data; identifying one or more characteristics of the one or more mechanical vibrations generated in the axial flux machine from the vibration sensor data; comparing the identified one or more characteristics of the one or more mechanical vibrations in the axial flux machine from the vibration sensor data with a model defining a response of the axial flux machine to the injected test signal; and determining if the vibration sensor data from the sensors is within a threshold difference of the model response.

The techniques described offer a way of testing an axial flux machine and its sensors before being put into operation, or part of an in-situ testing procedure during its operational lifetime. By comparing the identified one or more characteristics of the one or more mechanical vibrations in the axial flux machine from the vibration sensor data with a model defining a response of the axial flux machine to the injected test signal, it may be possible to determine if the vibration sensor data from the sensors is as expected from the model, or if there are differences. If there are differences, it may be possible to determine if those differences are within a tolerance, or if they are beyond a tolerance, in which case either the machine is not working within expected parameters, or the vibration sensors are not outputting correct data.

In the method, identifying one or more characteristics of the one or more mechanical vibrations generated in the axial flux machine may comprise identifying at least one of a frequency component and bandwidth of respective one or more mechanical vibrations in the axial flux machine from the vibration sensor data.

The method may comprise adjusting the test signal in order to adjust one or more characteristics of the one or more mechanical vibrations generated by the test signal in the axial flux machine. Comparing the identified one or more characteristics of the one or more mechanical vibrations in the axial flux machine from the vibration sensor data may comprise comparing the identified one or more characteristics of the one or more mechanical vibrations generated by the adjusted test signal with a model defining a response of the axial flux machine to the injected adjusted test signal.

The injected test signal is configured to generate two or more mechanical vibrations, each having a different frequency from each other. The frequencies of the respective two or more generated mechanical vibrations are chosen to generate one or more harmonic beat mechanical vibrations having a different frequency to the two or more generated mechanical vibrations.

The alternating current through each coil may be represented as vectored direct current components comprising a Direct current ($I_d$) component and a Quadrature current ($I_q$) component that are orthogonal to one another, and wherein, when the test signal is an injected alternating current, the test signal comprises a modulated current component added to at least one of the Quadrature Current ($I_q$) and the Direct Current ($I_q$) components to generating the one or more mechanical vibrations in the axial flux machine.

The alternating current supplied to the plurality of coils may be a three-phase alternating current, and wherein $I_d$ and $I_q$ represent vectored direct current components of the combination of all three-phases.

The method may comprise generating a first warning signal if a difference between the one or more characteristics of the one or more identified mechanical vibrations and the one or more characteristics in the model is greater than the threshold difference.

The detected one or more mechanical vibrations in the axial flux machine are at lower frequencies to a principal resonant frequency of the axial flux machine.

The principal resonant frequency of the axial flux machine may be at or around the $60^{th}$ order harmonic of the axial flux machine, and the frequencies of the identified one or more mechanical vibration may be at or around a $20^{th}$ and/or $40^{th}$ order harmonic of the axial flux machine.

In any of the above examples, the axial flux machine may be a motor or a generator.

LIST OF FIGURES

The present invention will be described, by way of example only, and with reference to the accompanying figures, in which:

FIG. 1*a* shows a schematic representation of an axial flux stator;

FIG. 1*b* shows a simplified systems diagram of an axial flux machine and controller(s);

FIG. 2*a* shows a graph of the force around a motor when both stator halves are active;

FIG. 2*b* shows the force per frequency order (harmonics) of the motor of FIG. 2*a;*

FIG. 3*a* shows the force around the motor of FIG. 2*a* but when one half of the stator is inactive i.e. open circuit;

FIG. 3*b* shows the force per frequency order (harmonics) of FIG. 3*a;*

DETAILED DESCRIPTION OF THE PREFERRED EMBODIMENTS

Figure 1A:
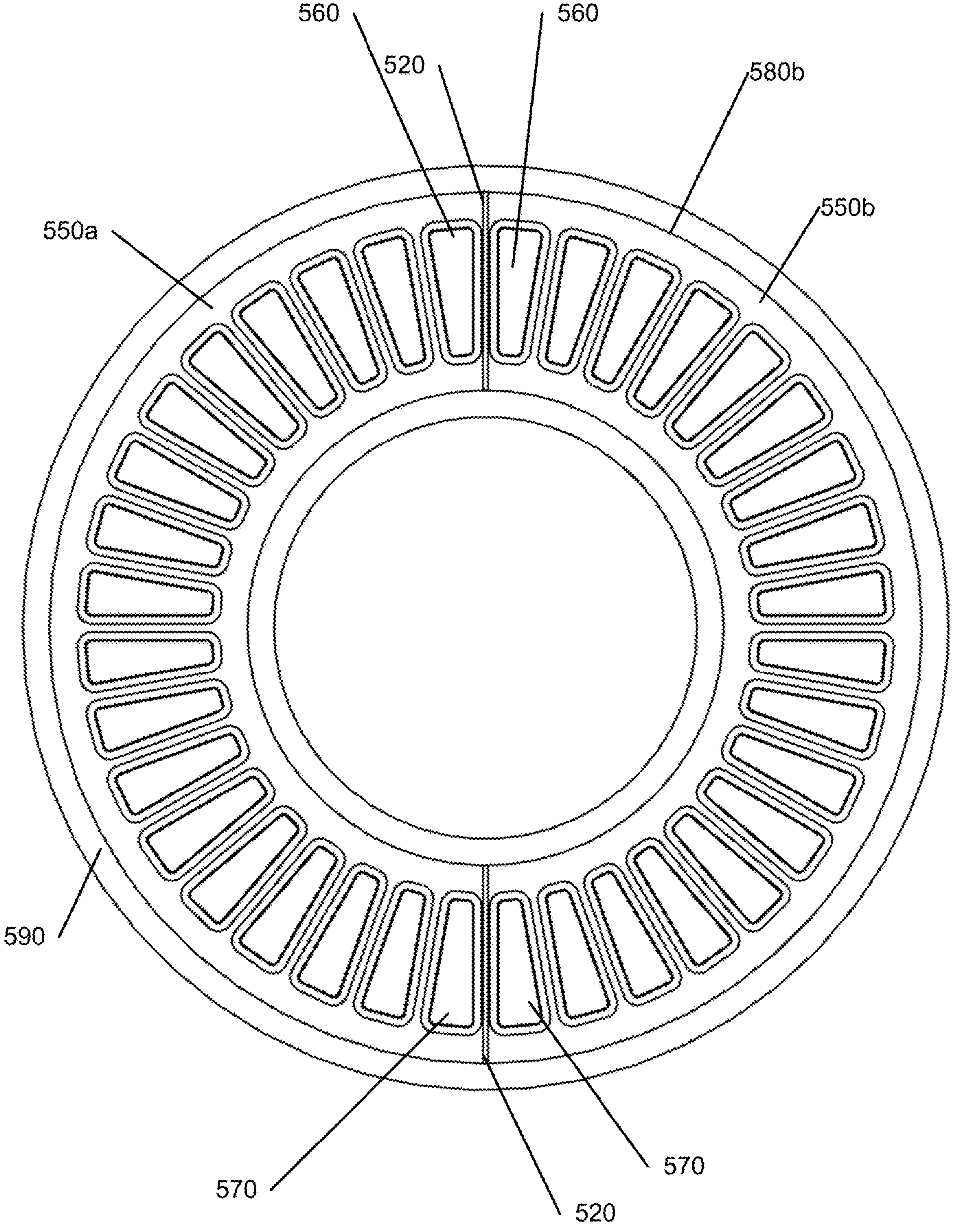

In brief, we will describe a method and controller for controlling an axial flux machine in which an alternating current or voltage supplied to the plurality of coils injects a compensation signal to generate mechanical vibrations in the axial flux machine. The compensation signal is applied in response to detecting one or more mechanical resonances in the axial flux machine that are at frequencies that are different to a principal mechanical resonant frequency of the axial flux machine. One or more characteristics of the one or more mechanical resonances in the axial flux machine are identified, and in response to the identification of the one or more characteristics, the compensation signal is adjusted. The mechanical vibrations generated by the compensation signal and the adjusted compensation signal are for reducing a respective amplitude of one or more of the detected mechanical resonances in the axial flux machine.

The present invention is for axial flux motors and generators in general machines and may be applied to any axial flux topology in which a stator comprises stator bars/teeth on which coils are wound. Axially opposing a stator is a rotor which may in the instance of a single stator dual rotor topology, comprise two rotor discs joined through a common axis. Rotors may be permanent magnet with back-iron yoke or Halbach formats each of which has its own construction techniques. Whilst the techniques and form of the axial flux machine described below is aimed at a single-stator-double-rotor topology, the techniques described are also applicable to single-stator-single-rotor topologies and single-rotor-double-stator topologies.

With reference to our co-pending patent application GB2301792.4, filed 8 Feb. 2023, we describe an arrangement of an axial flux machine in which stator coils are grouped and isolated from each other. In particular, we described a stator that has a plurality of stator bars disposed circumferentially at intervals around an axis and a housing for enclosing the plurality of stator bars. Each of the stator bars has a set of windings wound therearound to form a stator coil stack for generating a magnetic field generally parallel to the axis. The plurality of stator bars may be arranged into at least a first group of stator bars and a second group of stator bars, where the first and second groups of stator bars being isolated from one another.

In a first arrangement, this isolation may, for example, take the form of electrical isolation where each of the different first and second groups of stator bars are coupled to and driven by a different controller.

In an alternative arrangement, or as well as the electrical isolation, the housing may be provided with isolated chambers, each filled with a flowing cooling fluid, where each of the first and second groups of stator bars are located in respective first and second chambers flooded with cooling fluid. The first and second chambers are physically isolated from each other so that the cooling circuits remain separated.

Such arrangements provide redundancy. For example, if one or more coils controlled by one of the controllers (or the controller itself) fails, the machine may still be controlled by the working group(s) of coils and controller(s).

Similarly, should one of the cooling circuits for a group of coils fail, the remaining coils still being cooled may still be driven respective controller(s). However, the skilled reader would understand that magnetic imbalances will occur in such an arrangement when only a selection of the coils are being driven by the controller to produce the required magnetic fields to drive the rotor(s). We shall describe this in more detail below.

With reference to FIG. 1*a* there is a shown a schematic representation of a 36-pole axial flux stator divided into two separate stator bar groups. Each group is separated from the other by walls or dividers 520, which both delineates the two groups of stator bars, and provides a physical and liquid tight separation between the groups of stator bars, effectively dividing the stator housing into two chambers 550*a, b*. Each group of stator bars may be driven by a single controller, or, each group may be driven by separate controllers. Similarly, an arrangement may be provided where there is a single chamber but there being two controllers. Whilst we describe an arrangement where the stator comprises 36 stator poles or stator coil stacks, other numbers of stator poles may be considered.

Under normal operation both groups are driven by respective controllers to operate as a single unit providing rotating magnetic poles that interact with rotor permanent magnets disposed on a rotor that causes them and the rotor to which they are attached to rotate. As can be seen in FIG. 1, separation walls or dividers 520 not only divide the stator into two chambers, but also act as physical barriers and liquid seals between adjacent coils 560 and 570 in each half.

Such a physical barrier between coils is beneficial should burnout failure be experienced by one coil and the failure mode generates excessive heat in a neighbouring armature which also fails. With such a failure, walls 520 can prevent propagation of burnout failure from one independent stator to the other and in such an event one stator half may be shut down or downgraded in its operation whilst the unaffected stator half continues to operate independently.

For each stator half or chamber 550*a,b* to operate independently of the other, each group of stator bars contains its own cooling inlet (not shown) and outlet (not shown) ports and a port for mounting a sensor(s) to monitor stator coil temperature (not shown).

In stark contrast to normal electrical engineering rules, which seeks symmetry and force balance in electric machines, and as a consequence invokes duplicate redundant machines in-case of an active machine failure, the present invention includes a dual wound stator in a single stack, which under normal operation acts as a single high-power-dense unit of short axial length.

Under the exceptional circumstance of a fault condition in one of the stators, the formerly single electrical machine, figuratively splits into its component parts, enabling isolation of the faulty stator half, with the remaining working stator, taking a 'limp-home' (reduced power rating) role. Separate coolant flow, temperature monitoring and power supply for each stator half provides aerospace level fail-safe and redundant fail-safe operation for each stator.

For force balance reasons, electrical machine engineers seek to distribute stator impulse forces, e.g., for a 3-phase axial flux electric machine, adjacent armatures are powered in sequence with U, V, W phases, leading to a 12-core stator providing 4×3-phase symmetric quadrants with magnetic forces rotating in synchronisation with opposing rotor magnet poles.

A particular torque harmonic injection (by means of current) is taught used to dampen down inherent and predictable mechanical resonances that occur due to inherent properties of axial flux machines. Torque injection current inject, of this form, has little effect for radial flux machines and a new approach of injecting torque/direct current is required to dampen the significant imbalance caused by operating only one half of the stator bars shown in FIG. 1.

The YASA motor topology presently taught provides 2 sets of electrically independent windings (they do not share a star connection point) that are arranged in different semicircles such that this is no interleaving of stator poles, i.e. UVW windings. The windings can be thought of as being two independently fed 3 phase motors that share a rotor and thus share a shaft and output. There is limited sharing of the magnetic circuit through a common rotor.

The configuration of the two semi-circular 3-phase windings provides intrinsic redundancy (improved reliability) and an excellent degree of separation with regarding common faults. This in-plane, common stator bar circumference axial flux dual stator approach opens this machine construction for use in systems where operation continues to be required in the event that one set of windings is not being fed, for example due to a controller failure. Under this condition the torque is generated only in one of the semi-circles leading to additional mechanical imbalance and thus possible resonance and rotor deflection. Furthermore, axial force is still seen by the non-operating semi-circle of the stator due to the magnets pulling into the metal in the stator poles of the non-operating half of the stator. As such, this also causes resonance excitations.

A common approach is to strengthen the rotor to avoid deflection and to increase the rotor mass to be able to 'ride through' (filter) any additional resonance. This has the disadvantage of increasing system mass and cost. An alternative approach would be to interleave the two sets of 3-phase poles, but this defeats the safety case of mechanical separation between sets of 3-phase windings.

The present invention seeks to reduce mechanical resonances within the axial flux machine triggered by a loss of operation of one of the semi-circle windings whilst adding the benefits of detection and removal of additional resonance/oscillations being transferred into the machine from external systems.

Figure 1B:
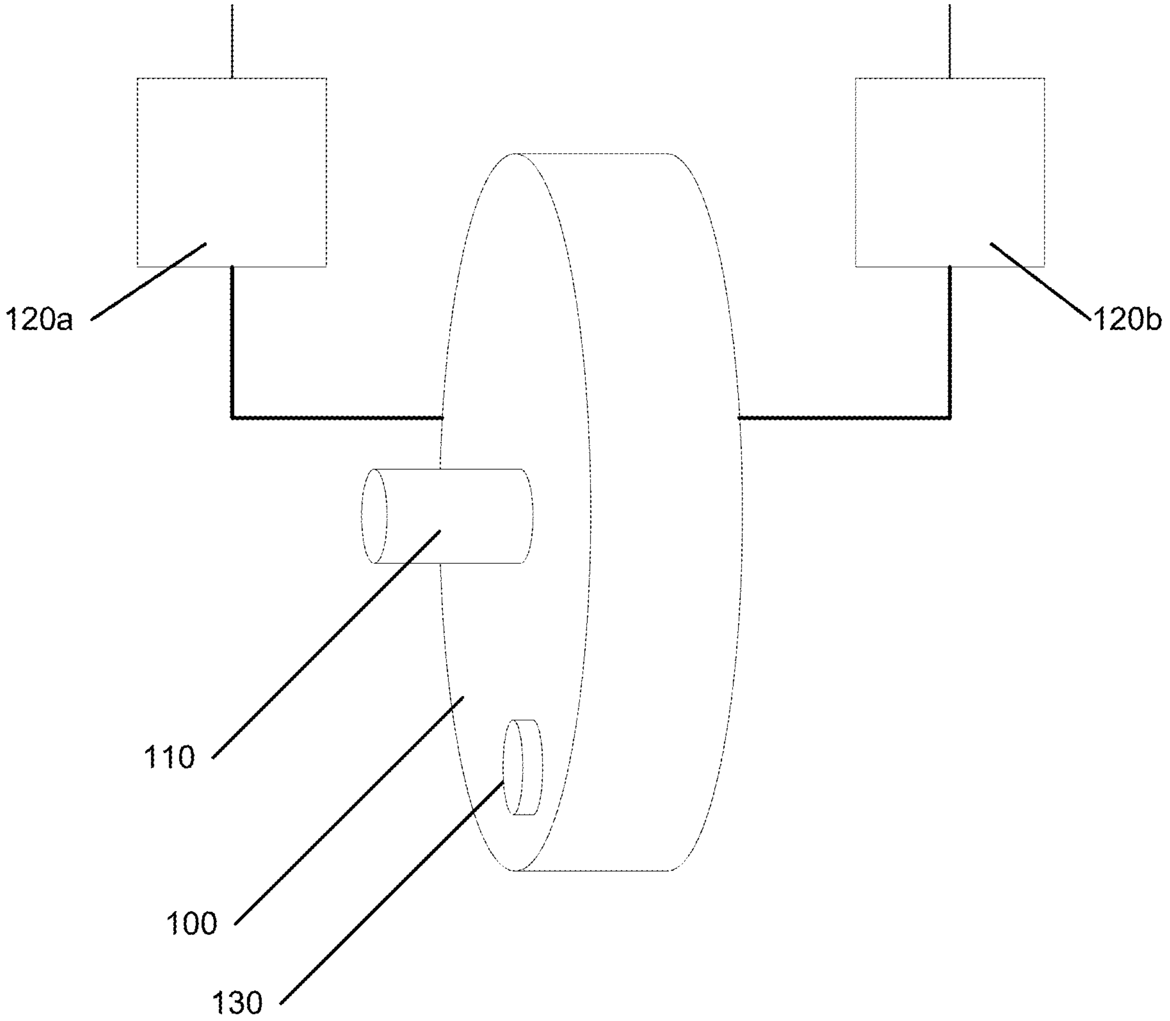

FIG. 1*b* shows a simplified systems diagram of an axial flux machine and controller(s). In this system, the axial flux machine 100 comprises a stator and one or more rotors as described above. The rotor(s) are coupled to an output shaft 110 for mechanically driving a load. As described above, the stator bars are isolated into two groups, this may be via physically isolated cooling chambers, and/or electrically isolated groups. In the figure, two controllers 120*a*, 120*b* are provided, each controlling or driving respective groups of stator coils within the stator of the axial flux machine 100. Each controller 120*a*, 120*b* is connected to a power supply (not shown) which can be separate power supplies, or the same power supply. The controllers work to produce the required magnetic fields to drive the rotor(s) of the axial flux machine 100 in order to drive the load (not shown) connected to the shaft 110. Each of the controllers 120*a*, 120*b* may receive vibration sensor data from one or more vibration sensors 130 located at different locations about the axial flux machine, or located at different locations about the structure to which the axial flux machine 100 is coupled, connected or mounted.

Figure 2A:
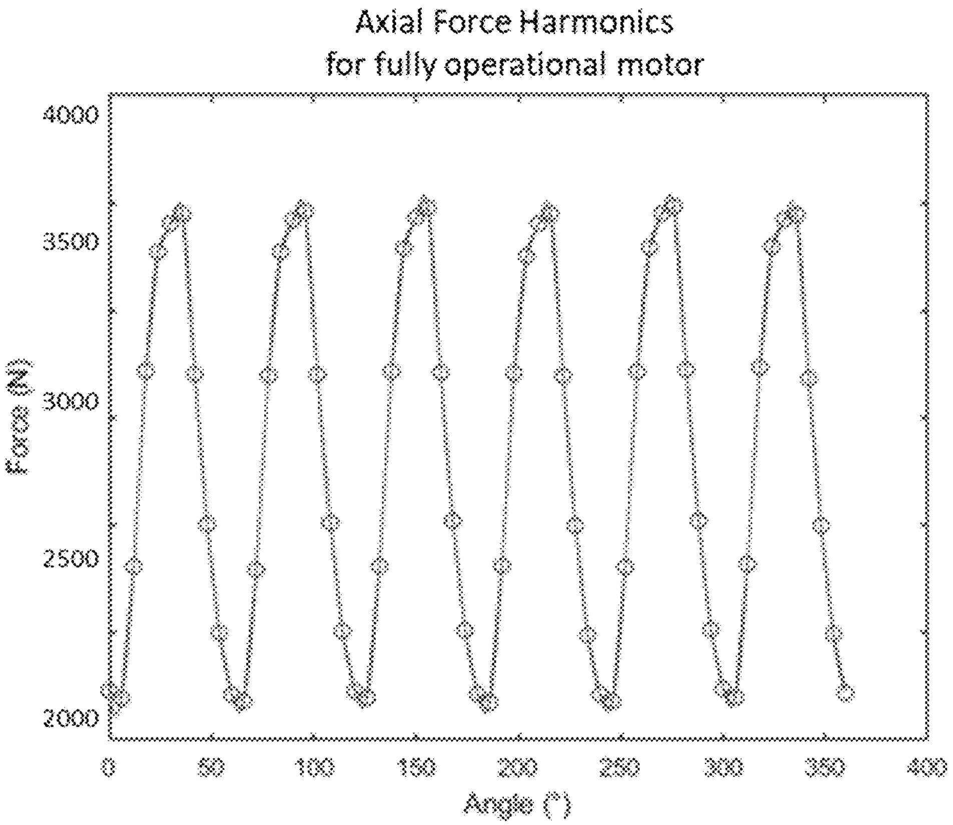

With reference to FIG. 2*a,b*, there is shown in FIG. 2*a*, a graph of the force around a motor of the present invention when both stator halves are active. The pole pairs of this example motor result in 6 periods of force cycle during one 360-degree mechanical revolution shown. Cycles have been superimposed onto the average force.

Figure 2B:
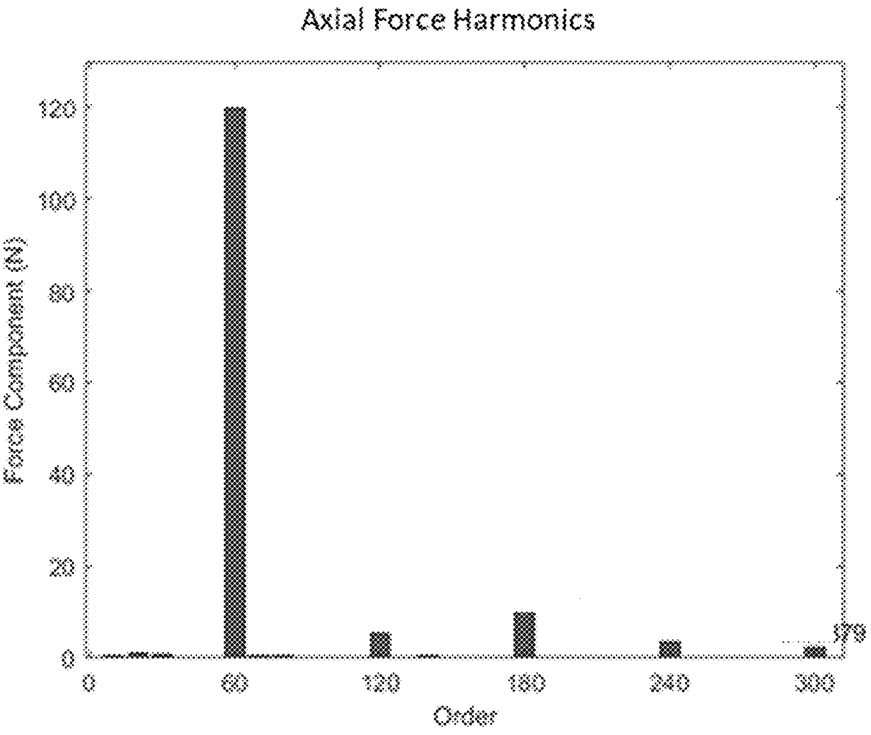

FIG. 2*b* shows the force per frequency order (harmonics) and shows that in fully active operation i.e. with both stator halves operational and working cooperatively as a single unified stator, the $60^{th}$ order (and multiples of 60) are dominant. It will be understood by those with reasonable skill in the art that this multiple is a consequence of a particular motor design and could be different for other designs. We will hereon refer to this machine topology dominant mechanical resonance vibration as the principal resonant frequency or order. Under normal operation, for this specific topology, resonances in the $60^{th}$ and greater orders (for this particular topology) do not generally contribute negatively to NVH (noise, vibration and harshness) characteristics of the machine. However, resonant orders less than this principal resonant frequency can become noticeable and dominant in the NVH performance of the machine.

Figure 3A:
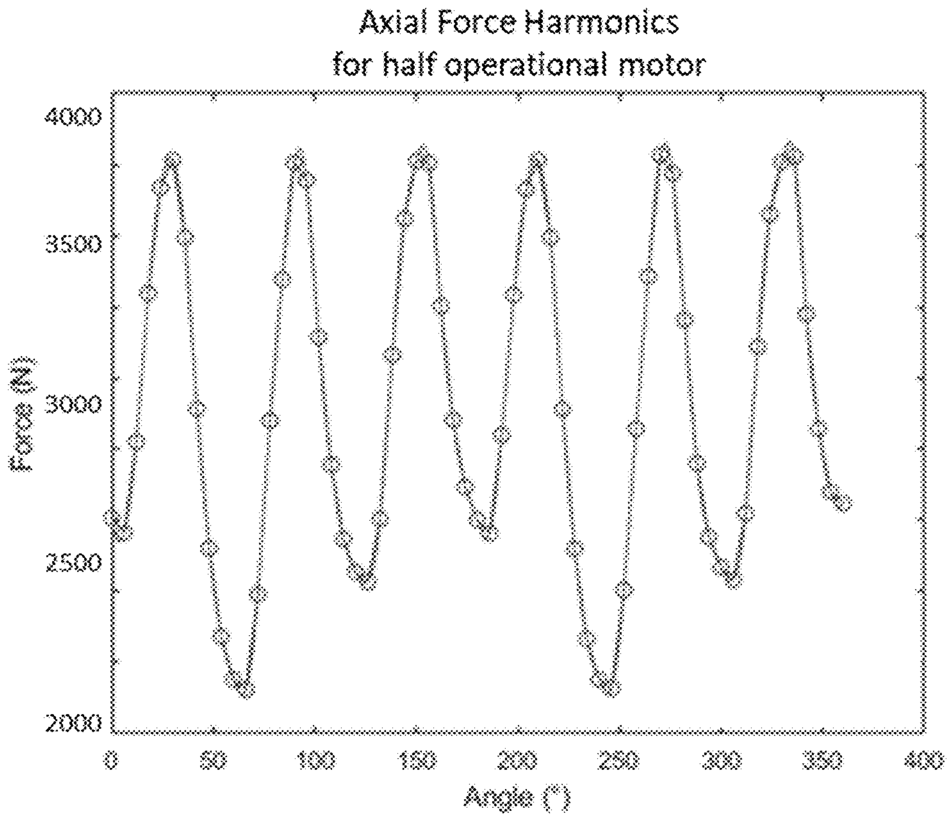

With reference to FIG. 3*a,b*, there is shown in FIG. 3*a* the force around the same motor as described for FIG. 2*a*, only in the data shown in FIG. 3*a* one half of the stator is inactive i.e. open circuit. It is notable in FIG. 3*a* that whereas there is variation in the 2nd, 3rd, 5th and 6th cycles when compared to the whole operation motor forces shown in FIG. 2*a*, it is the 1st and 4th cycle lower halves are substantially affected by loss of a stator half.

Figure 3B:
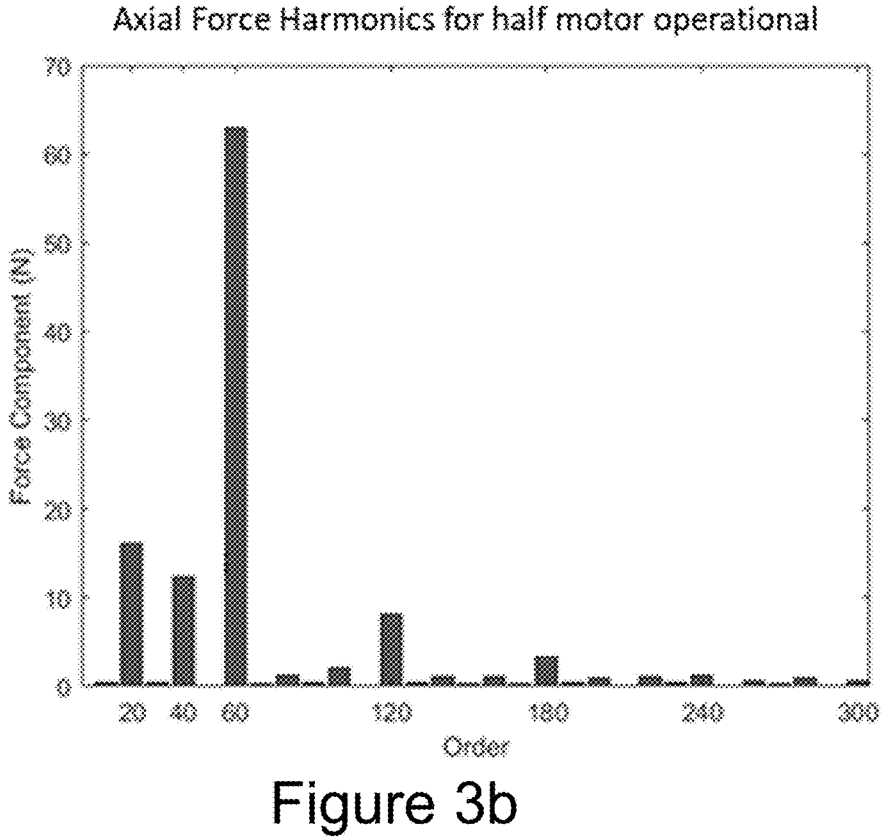

FIG. 3*b* shows the force per frequency order (harmonics) with one half of the stator inactive. The $60^{th}$ order (principal resonant frequency for this topology) force component is halved in comparison to the fully active stator seen in FIG. 2*b*, and when half the stator is inactive the $20^{th}$ and $40^{th}$ harmonics are significantly increased due to the uneven axial force oscillations seen in FIG. 3*a* i.e., the 1st and 4th cycle shapes. Resonant order modes below the principal resonant order mode ($60^{th}$ in this case) generally negatively impact on the NVH performance of the machine. As would be understood by those in this field, other machines might have different principle resonant order modes depending on their form and arrangement. Similarly the resonant orders would be different in such machine. The general principle remains the same: lower order modes of resonance to the machine to the principal resonant order of the machine are the modes of resonance to be addressed by the techniques described herein.

It can be seen that some of the force imbalance effects of running a half stator are predictable and open loop compensation may be used to suppress most of the resonant. However, the peaks have a large spread (not shown) and closed loop suppression is preferably performed.

The present invention utilises an injected electrical current (and thus, by extension, torque) or voltage to the power signals applied to the coils to induce mechanical vibrations within the axial flux machine at one or more frequencies in order to reduce or dampen the resonant frequencies that are lower than the principal resonant frequency. As mentioned above, since the location of the resonant frequencies are predictable, open loop compensation may be used. However, a closed loop technique where identification of one or more characteristics of the resonant frequencies are used to adjust the injected electrical current or voltage, advantageously allows the compensation signal may be used to "tune" the generated mechanical vibrations (in terms of, for example, frequency and/or Q factor and/or bandwidth) in order to maximise the reduction in the resonant frequencies.

In the present invention, a controller is electrically coupled or connected to the plurality of stator coils. The controller has one or more electrical inputs for receiving one or more supply voltages or currents, for example a DC source to convert into a multi-phase AC output. The controller also has one or more electrical outputs for supplying one or more alternating currents or voltages to the axial flux machine coils, for example a multi-phase output voltage to the axial flux machine stator. There may be, for example, a three-phase AC output voltage, although more phases are also possible.

Under normal operating conditions, the controller would be driving the plurality of coils to generate the required magnetic fields. This may be done using a variety of techniques, for example PWM (Pulse Width Modulation) as directed by SVM (Space Vector Modulation) algorithms and the like. The required magnetic fields are determined by the controller based on a desired output torque or RPM and the known position of the rotor (for example based on data from a rotor position sensor).

In the case where one of the controllers is open circuit (so only a portion of the stator coils can be driven by a still-functioning controller), the controller detects mechanical resonances in the axial flux machine using vibration sensor data received from the one or more vibration sensors located at different parts of the axial flux machine. Since the resonances in this scenario are predictable (that is, for the case where the machine topology has a dominant principal resonant frequency at the $60^{th}$ order, the additional resonant frequencies become noticeable at or around the $20^{th}$ and $40^{th}$ orders when only a portion of the stator coils are being driven), an open loop or feed-forward technique may first be employed.

In this technique, the controller controls or drives either an alternating current or an alternating voltage supplied to the plurality of coils to inject a compensation signal into the coils. The compensation signal generates mechanical vibrations in the axial flux machine, which reduce respective amplitudes of one or more of the detected mechanical resonances of the axial flux machine.

However, an open loop or feed-forward technique on its own does not provide the best reduction in the unwanted resonances. As such, the technique further employs a closed-loop or feedback aspect in order to better improve the performance.

In the closed-loop aspect, the controller identifies one or more characteristics of the one or more mechanical resonances in the axial flux machine, and in response to the identification of those one or more characteristics, adjusts the compensation signal.

The one or more characteristics of the one or more mechanical resonances in the axial flux machine that are identified by the controller may, for example, be a frequency component of the mechanical resonance, a bandwidth or Q-factor of the mechanical resonances. It may also be a phase or the phase offset of the mechanical resonance.

As such, the controller is configured to adjust the compensation signal in response to the identified one or more characteristics of the one or more mechanical resonances. The controller adjusts the compensation signal in order to adjust one or more characteristics of the one or more mechanical vibrations generated by the compensation signal in the axial flux machine. The one or more characteristics of the one or more mechanical vibrations generated by the compensation signal may be, for example, be a frequency component of the generated mechanical resonance, a bandwidth or Q-factor of the generated mechanical resonances. It may also be a phase or phase offset of the generated mechanical resonance.

For example, it has been found that, whilst the open loop technique of providing a compensation signal that attempts to compensate for the resonances at the $20^{th}$ and $40^{th}$ orders, the closed loop technique may be used to tune the compensation signal to broaden the bandwidth of the $20^{th}$ and $40^{th}$ order resonances based on the vibration sensor data, so that the compensation signal (and thus the compensatory mechanical vibrations in the axial flux machine generated by the compensation signal) may better reduce the amplitude of the unwanted $20^{th}$ and $40^{th}$ order resonances.

The compensation signal could be injected as an alternating current, or an alternating voltage. In practice, alternating current is the preferred means of injecting the compensation signal.

The alternating current through each coil may be represented as vectored direct current components comprising a Direct current ($I_d$) component and a Quadrature current ($I_q$) component that are orthogonal to one another. The controller generates the compensation signal using a modulated current component added to at least one (or both) of the Quadrature Current ($I_q$) and the Direct Current ($I_q$) components to generating the one or more mechanical vibrations in the axial flux machine. In the case where the alternating current supplied to the plurality of coils is a three-phase alternating current, the $I_d$ and $I_q$ currents represent vectored direct current components of the combination of all three-phases. Similarly, for systems using more than three phases, the $I_d$ and $I_q$ currents represent vectored current components of the combination of all of the multiple phases.

The modulated current may be sinusoidal or modulated to provide any required shape to provide the correct characteristics as required by the technique.

When the controller is adjusting the compensation signal, the controller is adjusting the modulated current component in response to the identified one or more characteristics of the one or more mechanical resonances in order to adjust one or more characteristics of the one or more mechanical vibrations generated by the compensation signal in the axial flux machine.

Figure 4:
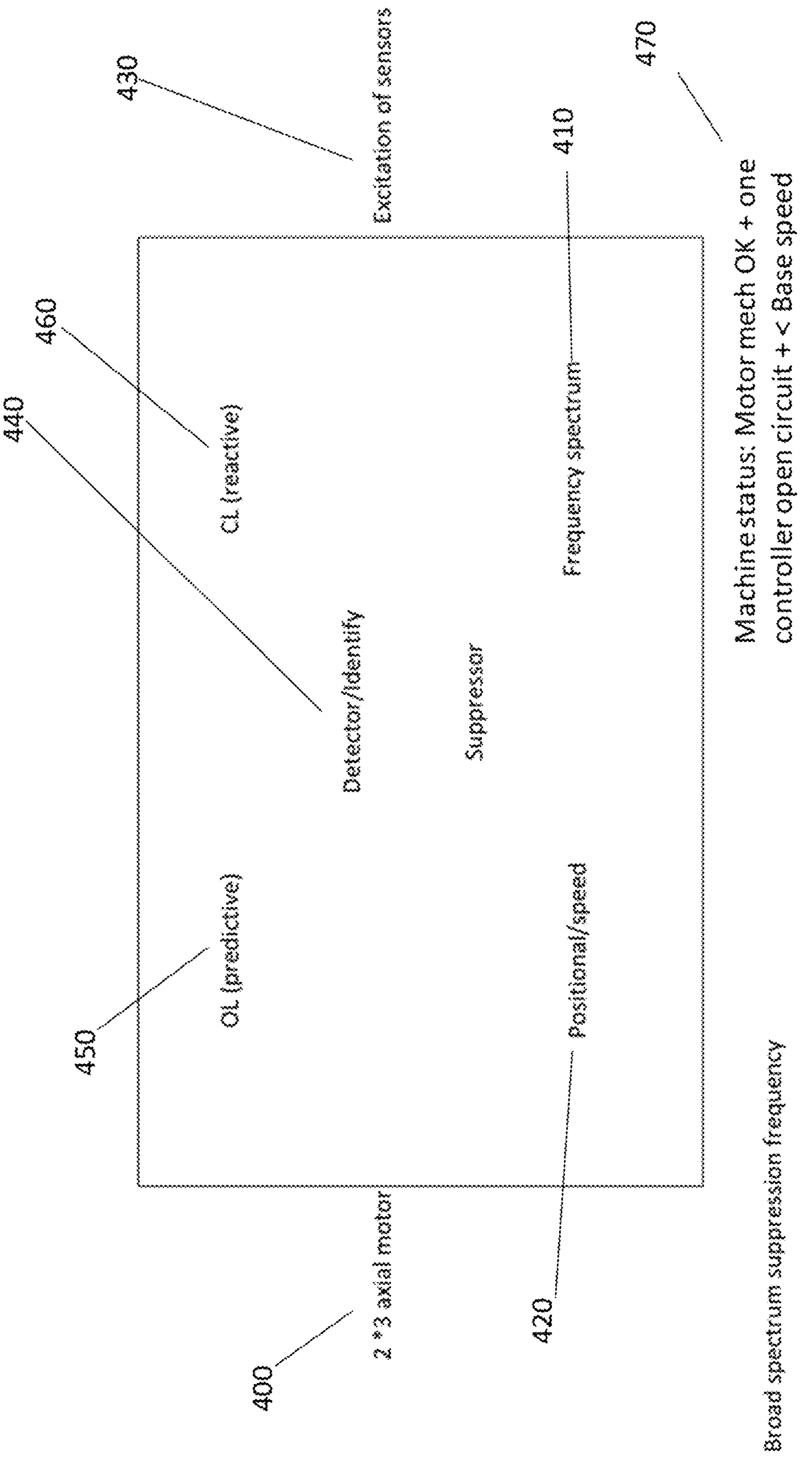
FIG. 4 shows a systems in terms of functional approach, of actors, inputs and outputs.

With reference to FIG. 4 an example approach adopted to cope with force imbalance created through one geometrical half of a stator being non-operational, is shown in terms of functional approach, of actors, inputs and outputs. As is shown in FIG. 4 the machine status 470 in a fault condition to be accommodated by the present invention is that of the motor mechanicals, e.g., bearing, rotor and stator structure etc., are in serviceable condition, one of the stator halves is non-operational and will have failed to open circuit, and the rotor speed is less than the base speed defined as the point on the motor's torque speed graph at full torque and where the motor's back emf plus the voltage drop across the fully operational stator windings (due to the full torque current) matches the maximum phase to phase terminal voltage provided by the DC bus voltage.

The main actors are the axial flux machines 400, two halves normally acting as one, but capable of operating independently. In multi-prop aircraft, adjacent motors and associated propellers though electrically and cooling wise, are considered independent isolated actors, they are nevertheless connected more or less tenuously though a common airframe and perhaps wingspan through which mechanical vibration may lead to resonance driving influence on apparently separated machines. Proximity, structure and mounting stiffness are factors that influence the effect of 'other' machine actors on a machine with fault running in half stator mode, and predictive current injection alone is not a viable option.

In the instance of half of a stator being non-operational there is a repetitive positional change in attractive force between rotor and stator which is also a function of rotor speed 420.

There is potential and value in having sensors 430 outboard of the motor to detect vibration effects and recognise effective dampening, and also to detect vibration inputs to the motor that can occur from outside, e.g., from the airframe, secondary power/generator units and other systems capable of producing vibrations in a frequency range coinciding with resonances on the motor.

Sensors 440 may advantageously also be placed in the motor providing detection and identification of resonant force drivers.

Collating these inputs and drivers are open-loop (OL) 450 predictive and closed-loop (CL) 460 reactive strategies including direct current injection for suppressing vibrations, as described above.

Of some surprise is that when half a stator is inactive in an axial flux dual stator motor, the imbalance forces are not as significant as perhaps intuitively anticipated, and are largely due to out of balance repulsive force from quadrature currents ($I_q$) no longer applied in the non-operational stator half. Surprisingly these repulsive forces may be countered by propitious and timely application of $I_d/I_q$ current injection in the remaining good half.

Typically $I_d$:$I_q$ ratio is 1:10 and when half a stator is inactive there remains an attractive force between permanent magnets on the rotor and inactive stator bars. The present invention includes potential to add direct $I_d$ current to the active stator half to reduce the difference in attractive force between magnets and stator poles. This will reduce the amplitude of the $20^{th}$ and $40^{th}$ force harmonics. Whereas $I_d$ current injection is likely to be large and does not contribute to torque and therefore motor efficiency, there is value in having this option during dynamic changes in speed and over specified speed ranges that are suitable for operating in half stator mode.

It has been suggested that stiffening rotors to overcome deflection and adding rotor mass to dampen rotor response is sufficient to address usual resonance sources. However, these passive approaches add life-time flight mass and accompanying cost and are unable to cope with resonant driving forces that come from outside of the motor. For propulsion systems having multi axial-flux motors and propellers, there is potential for one motor/propeller to affect another motor/propeller joined by being mounted on the same wing or airframe. In this instance reactive and predictive harmonic injection of $I_d/I_q$ currents are jointly required to suppress vibration.

A particular advantage of the present invention is that injected $I_d/I_q$ currents can be used to generate vibration in otherwise properly operating motors and when used in conjunction with in-motor and outboard vibration sensors/detectors such 'test vibration' may be used to mimic defects, add known force/frequency insults to sensors to check their operation and sensitivity e.g., as a standard maintenance equipment check or as pre-programmed pre-flight checks. We will discuss this further below.

Figure 5:
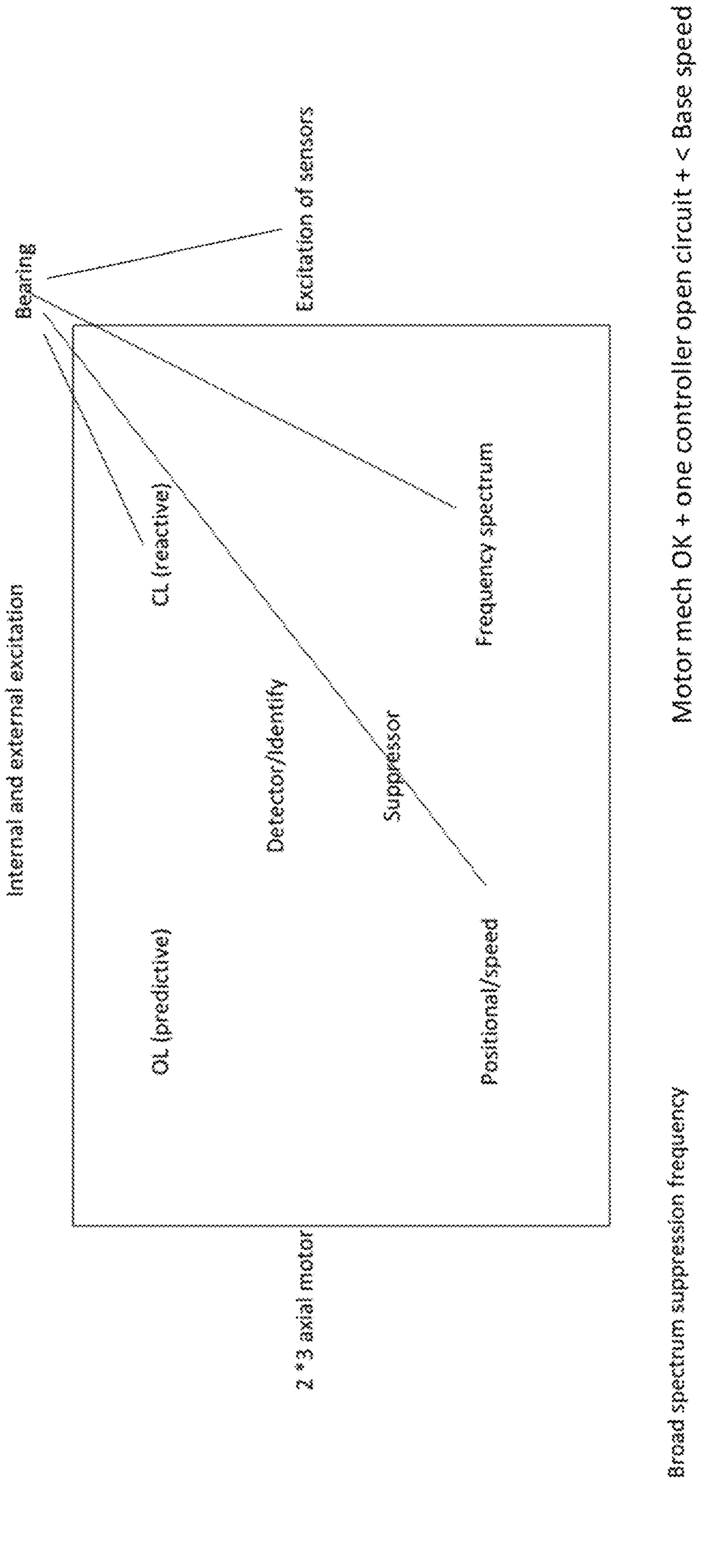
FIG. 5 shows a system similar to FIG. 4.

With reference to FIG. 5, of particular value and importance in aircraft propulsion systems is knowing the state of, and predicting failure/maintenance checks for bearing systems. The present invention provides a means of early detection of bearing vibration, and dependent on force drivers and their frequency and crucially axial rotation position can provide valuable insight to the nature of bearing challenges.

Operating a motor in a limp-home condition i.e., with half of the stator active introduces several immediate effects as the new operating condition occurs, including inter-magnet compression/relaxation cycles as different rotor magnets enter and leave the active stator semi-circle and this effect can cause position-based oscillation and resonance. The change to half stator operation is likely to be abrupt and step changes in loading, destabilised as the soon to be inactive stator, field decays, can cause oscillation through rotor deflection which ideally is mitigated by closed loop feedback. Mitigation is unlikely to be perfect and the remaining off-set force oscillation is borne by at least internal rotor bearings and could extend to bearings external to the motor. Such position-based oscillation can excite resonances.

It is possible to use the Park transform to obtain direct and quadrature current vectors which under full stator operating conditions will be close to an ideal circle. Deviation from this ideal circle can be used to detect bearing wear and also detect positional ripples as magnets leave and enter the active semi-circle. Positional ripples combined with feed forward and reactive compensation techniques combine to implement harmonic injection of $I_d/I_q$ current to mitigate out of balance forces.

Figure 6:
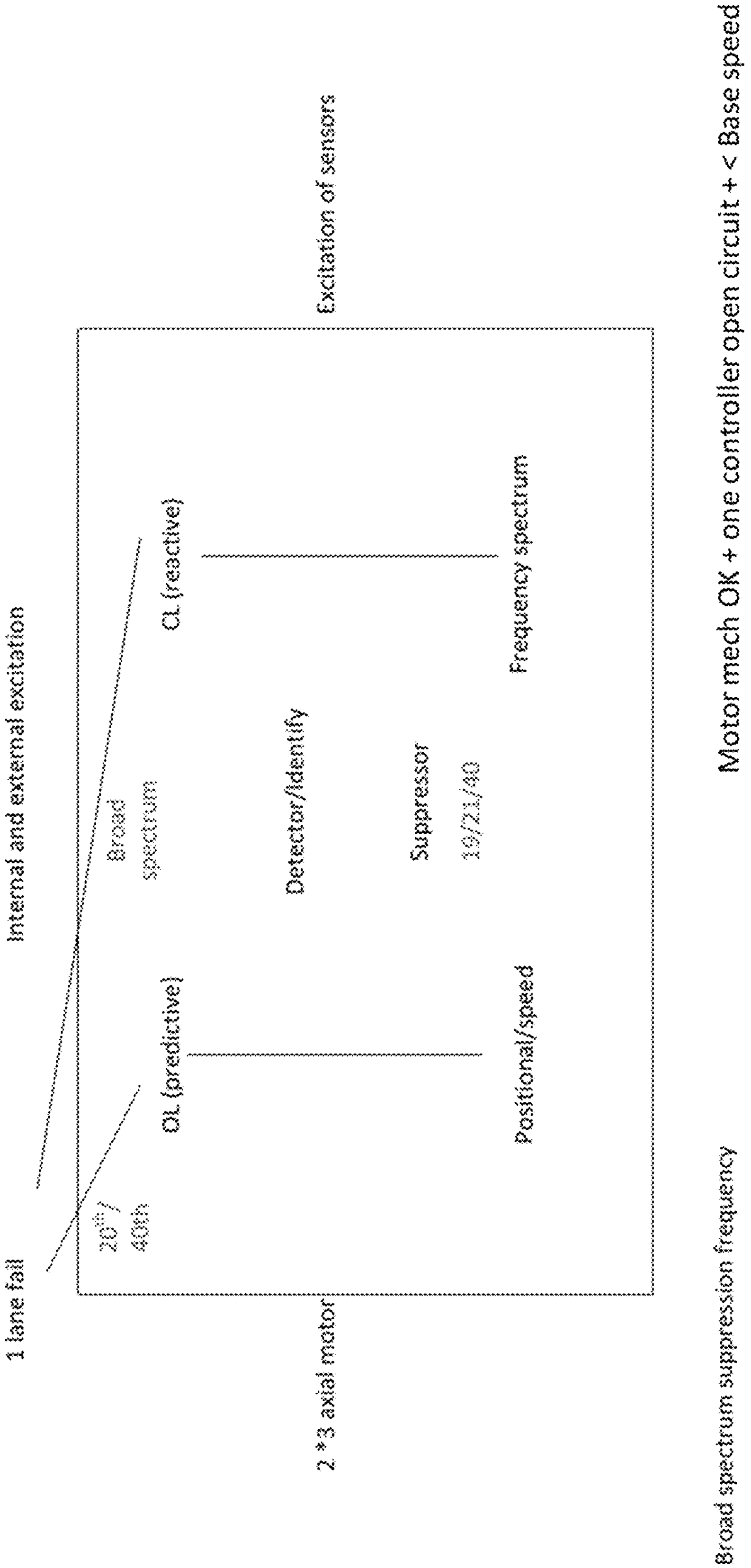
FIG. 6 shows an example system approach looking at the internal and external excitations.

With reference to FIGS. 2*b*, 3*b* and FIG. 6, there is seen in FIGS. 2*b* and 3*b* axial force harmonics that for whole stator operation FIG. 2*b* there is a single high level $60^{th}$ harmonic, whereas for half stator operation FIG. 3*b*, the $60^{th}$ harmonic is reduced, but there is now seen potentially troublesome lower $20^{th}$ and $40^{th}$ harmonics that were negligible in whole motor operation FIG. 2*b*, but which are now grown to significant values in FIG. 3*b* when operating in half stator mode. As discussed above, these resonant harmonics are particular to the preferred configuration of the axial flux machine. Other arrangements would have different principal resonant orders (other than the $60^{th}$), and the lower harmonics would not necessarily be the same as the $20^{th}$ and $40^{th}$ order as in the above case.

Though $20^{th}$ and $40^{th}$ harmonic force drivers are troublesome it is unlikely they will drive mechanical resonances because such resonances are normally found at lower frequencies. Nevertheless, there is potential for damage to be caused through fatigue and it is desirable to find a way to reduce the $20^{th}$ and $40^{th}$ harmonic force drivers.

Particularly for the $20^{th}$ and $40^{th}$ axial force harmonics there is opportunity to use beat frequency countermeasures for suppression.

Taking the $20^{th}$ axial force harmonic as a starting point, $19^{th}$, $21^{st}$ and $40^{th}$ harmonics are used as $I_d$ injection points with span of frequency and amplitude provided by the $19^{th}$ and $21^{st}$ harmonics and the difference between $19^{th}$ and $40^{th}$ and $21^{st}$ and $40^{th}$ harmonics providing a $20^{th}$ harmonic beat frequency. This approach uses the natural features of the system to produce a beat frequency axial force $20^{th}$ harmonic with frequency and phase adjusted to oppose the detrimental $20^{th}$ axial force harmonic caused by running in half stator mode.

As such, the controller may be configured to inject the compensation signal so as to generate two or more mechanical vibrations, each having a different frequency from each other. The frequencies of the respective two or more generated mechanical vibrations are chosen to generate one or more harmonic beat mechanical vibrations having a different frequency to the two or more generated mechanical vibrations. One or more of the generated mechanical vibrations and the generated harmonic beat mechanical vibrations may reduce a respective amplitude of one or more of the detected mechanical resonances.

With reference to FIG. 4 the present invention is intended to mechanically stabilise, through $I_d/I_q$ injection what is intuitively a significantly out of balance rotor:stator pairing caused by one half of the stator being open circuit and not producing the normal magnetic repulsive/attractive quadrature forces providing torque. Whereas this situation can be modelled, and OL control methods applied using look-up-tables (LUTs), there are unknown factors that will affect the accuracy and legitimacy of OL control strategies, such as environmental conditions, temperature, altitude, windspeed, and orientation/loading factors such as roll, pitch and yaw, balance of load in the aircraft, etc., which cannot be predicted and require fast CL feedback to provide satisfactory counter measures.

However, combining OL and CL methods results in total current inject demands ($I_d$+$I_q$) which a remaining current controller will be required to provide, and an absolute current limit will be imposed on these totals. It is quite possible OL and CL loops may suggest positive and negative injection of $I_d$ and/or $I_q$ currents and effectively fight each other to no benefit.

As closed loop injection is normally the more reliable control technique in fast changing unpredictable situations, and OL the more dogmatic/stable control format, it is often preferable to give overall control to OL feedback providing a stable control basis albeit potentially skewed by some factor or factors unknown and use CL feedback to rapidly provide fine tuning and so maintain motor control. The master OL sets a frequency spectrum for injection and the slave CL fine tunes this providing a bounded scaling gain to frequencies common to both methods. The master to slave relationship prevents opposing and wasteful $I_d/I_q$ injection demands that may otherwise occur if both OL and CL have equal weighting and they are working independently.

An advantage of operating OL and CL control loops in master slave configuration is the ability to gain sensor feedback from the CL loop during normal operation, i.e., with whole stator operational, and the OL/CL system 'learning' ways to reduce common vibration sources such as torque ripple.

Another feature of the present invention is the use of learning algorithms using OL predictive control based on theoretical calculations and modelling and modifying or writing new LUTs (Look-Up Tables) in the face of real-life CL feedback, with new data based on e.g., time-weighted averages of frequency and $I_d/I_q$ injection, with minimum vibration being the goal.

Constantly updated LUTs that reflect new operating conditions provides both stable operation within given $I_d/I_q$ injection bounds and ability to compare LUTs over time to discover normal behaviours and trends and predict machine element concerns e.g., bearings, controller switches, capacitors, propeller blade damage, and fatigue, wear and failure scenarios at an early stage providing a valuable basis for preventative maintenance.

For example, the controller may be configured to compare the one or more characteristics of the one or more identified mechanical resonances to a model defining one or more characteristics of the axial flux machine. This model, in its simplest form, could comprise a LUT up known values for certain operating parameters. The controller may generate a first warning signal if a difference between the one or more characteristics of the one or more identified mechanical resonances and the one or more characteristics in the model differ. The threshold at which level of difference would trigger a warning could be dependent on what parameter is being considered.

This first warning is based upon the detected resonant frequencies. Maybe the frequency of the resonant order is not where it is expected to be, or if the bandwidth or Q-factor are broader than expected. A warning may be generated in order to help identify potential issues with the axial flux machine.

The controller may also be configured to generate a second warning signal if a value of adjustment for adjusting the compensation signal is greater than a threshold limit of adjustment. For example, if, in the CL aspect, the compensation signal needs to be adjusted beyond its normal, expected, boundaries of operation, a warning may be raised, since the compensation signal required to reduce the detected unwanted resonances is potentially beyond the level of control that is possible or allowable within the confines of the mode of operation.

Whilst we have described the above embodiments with reference to vibration sensors providing vibration sensor data, alternative embodiments are envisaged in which no vibration sensors are present in the system, but vibration sensor data is inferred or determined from other data sources. For example, instead of providing vibration sensors mounted to one or more locations on or around the machine, ripples in the voltage or current demanded by the current controller to drive the machine may be used to infer or detect vibrations in the machine. Some techniques may use known measurements for specific operating conditions of the machine, for example known demand currents and voltage for given torque demands, and comparing those known values with the detected values in order to infer the frequency characteristics of the resonances in the machine.

Test Procedure

As mentioned above, the techniques described offer a way of testing an axial flux machine and its sensors before being put into operation, or part of an in-situ testing procedure during its operational lifetime.

The test may involve controlling at least one or both of an alternating current and an alternating voltage supplied to the plurality of coils to inject a test signal to generate one or more mechanical vibrations in the axial flux machine. As discussed above, the injection of a signal (here a test signal, rather than a compensation signal) may be performed by controlling the voltage or current. Preferably the current is controlled.

The test then detects the one or more mechanical vibrations in the axial flux machine using the vibration sensor data and identifies one or more characteristics of the one or more mechanical vibrations generated in the axial flux machine from the vibration sensor data.

By comparing the identified one or more characteristics of the one or more mechanical vibrations in the axial flux machine from the vibration sensor data with a model defining a response of the axial flux machine to the injected test signal, it may be possible to determine if the vibration sensor data from the sensors is as expected from the model, or if there are differences. If there are differences, it may be possible to determine if those differences are within a tolerance, or if they are beyond a tolerance, in which case either the machine is not working within expected parameters, or the vibration sensors are not outputting correct data. The model may in its simplest form be a LUT, but it may be more complex.

The identification of one or more characteristics of the one or more mechanical vibrations generated in the axial flux machine may comprise identifying at least one of a frequency component and bandwidth of respective one or more mechanical vibrations in the axial flux machine from the vibration sensor data. These may also include a Q-factor and/or phase or phase offset of the mechanical vibrations.

The test may adjust the test signal in order to adjust one or more characteristics of the one or more mechanical vibrations generated by the test signal in the axial flux machine. In this situation, comparing the identified one or more characteristics of the one or more mechanical vibrations in the axial flux machine from the vibration sensor data involves comparing the identified one or more characteristics of the one or more mechanical vibrations generated by the adjusted test signal with a model defining a response of the axial flux machine to the injected adjusted test signal.

As with the above-mentioned methods, the injected test signal may be configured to generate two or more mechanical vibrations, each having a different frequency from each other. The frequencies of the respective two or more generated mechanical vibrations may be chosen to generate one or more harmonic beat mechanical vibrations having a different frequency to the two or more generated mechanical vibrations. Again, these may be compared against the model to determine if there is any difference from the expected output of the vibration sensors.

The test may generate a first warning signal if a difference between the one or more characteristics of the one or more identified mechanical vibrations and the one or more characteristics in the model is greater than the threshold.

The detected one or more mechanical vibrations in the axial flux machine may be at lower frequencies to a principal resonant frequency of the axial flux machine. Again, with the axial flux machine as described, the principal resonant frequency of the axial flux machine may be at or around the $60^{th}$ order harmonic of the axial flux machine. The frequencies of the identified one or more mechanical vibration may be at or around a $20^{th}$ and/or $40^{th}$ order harmonic of the axial flux machine. As discussed above, this may be different for other axial flux machine topologies.

Whilst we have discussed the above in relation to an axial flux machine, it will be understood that the axial flux machine may be a motor or a generator.

No doubt many other effective alternatives will occur to the skilled person. It will be understood that the invention is not limited to the described embodiments and encompasses modifications apparent to those skilled in the art lying within the scope of the claims appended hereto.

The invention claimed is:

1. A method of controlling an axial flux machine, the axial flux machine comprising a stator comprising a stator housing enclosing a plurality of stator pole pieces disposed circumferentially at intervals around an axis of the machine, each of the stator pole pieces having a set of coils wound therearound for generating a magnetic field; and a rotor comprising a set of permanent magnets and mounted for rotation about the axis of the machine, the rotor being spaced apart from the stator along the axis of the machine to define a gap between the stator and rotor and in which magnetic flux in the machine is generally in an axial direction, the method comprising:

detecting one or more mechanical resonances in the axial flux machine;

controlling at least one or both of an alternating current and an alternating voltage supplied to the plurality of coils in response to detecting the one or more mechanical resonances to inject a compensation signal to generate mechanical vibrations in the axial flux machine for reducing a respective amplitude of one or more of the detected mechanical resonances of the axial flux machine, identifying one or more characteristics of the one or more mechanical resonances in the axial flux machine;

adjusting the compensation signal in response to the identified one or more characteristics of the one or more mechanical resonances in the axial flux machine, wherein the detected one or more mechanical resonances in the axial flux machine are one or more mechanical resonances at frequencies that are different to a principal mechanical resonant frequency of the axial flux machine, wherein adjusting the compensation signal in response to the identified one or more characteristics of the one or more mechanical resonances includes adjusting the compensation signal in order to adjust at least a frequency and bandwidth of the one or more mechanical vibrations generated by the compensation signal in the axial flux machine.

2. The method according to claim 1, wherein detecting one or more mechanical resonances comprises receiving vibration sensor data, the vibration sensor data comprising vibration sensor data from one or more locations of the axial flux machine.

3. The method according to claim 2, wherein identifying one or more characteristics of the one or more mechanical resonances in the axial flux machine comprises identifying at least a frequency component and the bandwidth of respective one or more mechanical resonances in the axial flux machine from the vibration sensor data.

4. The method according to claim 1, wherein the injected compensation signal is configured to generate two or more mechanical vibrations, each having a different frequency from each other, and wherein the frequencies of the respective two or more generated mechanical vibrations are chosen to generate one or more harmonic beat mechanical vibrations having a different frequency to the two or more generated mechanical vibrations, and wherein one or more of the generated mechanical vibrations and the generated harmonic beat mechanical vibrations reduce a respective amplitude of one or more of the detected mechanical resonances.

5. The method according to claim 1, wherein the alternating current through each coil is represented as vectored direct current components comprising a Direct current ($I_d$) component and a Quadrature current ($I_q$) component that are orthogonal to one another, and wherein, when the compensation signal is an injected alternating current, the compensation signal comprises a modulated current component added to at least one of the Quadrature Current ($I_q$) and the Direct Current ($I_d$) components to generating the one or more mechanical vibrations in the axial flux machine.

6. The method according to claim 5, wherein adjusting the compensation signal comprises adjusting the modulated current component in response to the identified one or more characteristics of the one or more mechanical resonances in order to adjust one or more characteristics of the one or more mechanical vibrations generated by the compensation signal in the axial flux machine.

7. The method according to claim 5, wherein the alternating current supplied to the plurality of coils is a three-phase alternating current, and wherein $I_d$ and $I_q$ represent vectored current components of a combination of all three-phases.

8. The method according to claim 1, comprising comparing the one or more characteristics of the one or more identified mechanical resonances to a model defining one or more characteristics of the axial flux machine; and generating a first warning signal if a difference between the one or more characteristics of the one or more identified mechanical resonances and the one or more characteristics in the model is greater than a threshold difference.

9. The method according to claim 8, comprising generating a second warning signal if a value of adjustment for adjusting the compensation signal is greater than a threshold limit of adjustment.

10. The method according to claim 1, wherein the detected one or more resonances in the axial flux machine are at lower frequencies to the principal resonant frequency of the axial flux machine.

11. The method according to claim 10, wherein the principal resonant frequency of the axial flux machine is at or around a $60^{th}$ order harmonic of the axial flux machine, and the identified one or more resonant frequencies are at or around a $20^{th}$ and/or $40^{th}$ order harmonic of the axial flux machine.

12. A controller for an axial flux machine, the axial flux machine comprising a stator comprising a stator housing enclosing a plurality of stator pole pieces disposed circumferentially at intervals around an axis of the machine, each of the stator pole pieces having a set of coils wound therearound for generating a magnetic field; and a rotor comprising a set of permanent magnets and mounted for rotation about the axis of the machine, the rotor being spaced apart from the stator along the axis of the machine to define a gap between the stator and rotor and in which magnetic flux in the machine is generally in an axial direction, the controller comprising:

one or more electrical inputs for receiving one or more supply voltages or currents; and one or more electrical outputs for supplying one or more alternating currents or voltages to the axial flux machine coils, wherein the controller is configured to:

detect one or more mechanical resonances in the axial flux machine;

control at least one or both of an alternating current and an alternating voltage supplied to the plurality of coils in response to detection the one or more mechanical resonances to inject a compensation signal to generate mechanical vibrations in the axial flux machine for reducing a respective amplitude of one or more of the detected mechanical resonances of the axial flux machine, identify one or more characteristics of the one or more mechanical resonances in the axial flux machine;

adjust the compensation signal in response to the identified one or more characteristics of the one or more mechanical resonances in the axial flux machine, wherein the detected one or more mechanical resonances in the axial flux machine are one or more mechanical resonances at frequencies that are different to a principal mechanical resonant frequency of the axial flux machine, wherein the controller is configured to adjust the compensation signal in response to the identified one or more characteristics of the one or more mechanical resonances by adjusting the compensation signal in order to adjust at least a frequency and bandwidth of the one or more mechanical vibrations generated by the compensation signal in the axial flux machine.

13. The controller according to claim 12, wherein the controller comprises one or more sensor inputs for receiving vibration sensor data, and the controller is configured to detect the one or more mechanical resonances from the vibration sensor data, wherein the vibration sensor data comprises vibration sensor data from one or more locations of the axial flux machine.

14. The controller according to claim 13, wherein the controller is configured to identify one or more characteristics of the one or more mechanical resonances in the axial flux machine by identify at least a frequency component and the bandwidth of respective one or more mechanical resonances in the axial flux machine from the vibration sensor data.

15. The controller according claim 12, wherein the controller is configured to inject the compensation signal so as to generate two or more mechanical vibrations, each having a different frequency from each other, and wherein the frequencies of the respective two or more generated mechanical vibrations are chosen to generate one or more harmonic beat mechanical vibrations having a different frequency to the two or more generated mechanical vibrations, and wherein one or more of the generated mechanical vibrations and the generated harmonic beat mechanical vibrations reduce a respective amplitude of one or more of the detected mechanical resonances.

16. The controller according to claim 12, wherein the alternating current through each coil is represented as vectored direct current components comprising a Direct current ($I_d$) component and a Quadrature current ($I_q$) component that are orthogonal to one another, and wherein, when the compensation signal is an injected alternating current, the controller generates the compensation signal using a modulated current component added to at least one of the Quadrature Current ($I_q$) and the Direct Current ($I_d$) components to generating the one or more mechanical vibrations in the axial flux machine.

17. The controller according to claim 16, wherein the controller adjusts the compensation signal by adjusting the modulated current component in response to the identified one or more characteristics of the one or more mechanical resonances in order to adjust one or more characteristics of the one or more mechanical vibrations generated by the compensation signal in the axial flux machine.

18. The controller according to claim 17, wherein the alternating current supplied to the plurality of coils is a three-phase alternating current, and wherein $I_d$ and $I_q$ represent vectored direct current components of the combination of all three-phases.

19. The controller according to claim 12, wherein the controller configured to compare the one or more characteristics of the one or more identified mechanical resonances to a model defining one or more characteristics of the axial flux machine; and generate a first warning signal if a difference between the one or more characteristics of the one or more identified mechanical resonances and the one or more characteristics in the model is greater than a threshold difference.

20. The controller according to claim 19, wherein the controller is configured to generate a second warning signal if a value of adjustment for adjusting the compensation signal is greater than a threshold limit of adjustment.

21. The controller according to claim 12, wherein the detected one or more resonances in the axial flux machine are at lower frequencies to the principal resonant frequency of the axial flux machine.

22. The controller according to claim 21, wherein the principal resonant frequency of the axial flux machine is at or around a $60^{th}$ order harmonic of the axial flux machine, and the identified one or more resonant frequencies are at or around a $20^{th}$ and/or $40^{th}$ order harmonic of the axial flux machine.

23. An axial flux machine, comprising:

a stator comprising a stator housing enclosing a plurality of stator pole pieces disposed circumferentially at intervals around an axis of the machine, each of the stator pole pieces having a set of coils wound therearound for generating a magnetic field;

a rotor comprising a set of permanent magnets and mounted for rotation about the axis of the machine, the rotor being spaced apart from the stator along the axis of the machine to define a gap between the stator and rotor and in which magnetic flux in the machine is generally in an axial direction; and a controller comprising:

one or more electrical inputs for receiving one or more supply voltages or currents; and one or more electrical outputs for supplying one or more alternating currents or voltages to the axial flux machine coils, wherein the controller is configured to:

detect one or more mechanical resonances in the axial flux machine;

control at least one or both of an alternating current and an alternating voltage supplied to the plurality of coils in response to detection the one or more mechanical resonances to inject a compensation signal to generate mechanical vibrations in the axial flux machine for reducing a respective amplitude of one or more of the detected mechanical resonances of the axial flux machine, identify one or more characteristics of the one or more mechanical resonances in the axial flux machine;

adjust the compensation signal in response to the identified one or more characteristics of the one or more mechanical resonances in the axial flux machine, wherein the detected one or more mechanical resonances in the axial flux machine are one or more mechanical resonances at frequencies that are different to a principal mechanical resonant frequency of the axial flux machine, wherein the controller is configured to adjust the compensation signal in response to the identified one or more characteristics of the one or more mechanical resonances by adjusting the compensation signal in order to adjust at least a frequency and bandwidth of the one or more mechanical vibrations generated by the compensation signal in the axial flux machine.

* * * * *